United States Patent [19]

Zelenak, Jr. et al.

[11] Patent Number: 5,022,675

[45] Date of Patent: Jun. 11, 1991

[54] AIR BAG AND FOLDING TECHNIQUE

[75] Inventors: Daniel G. Zelenak, Jr., Rochester; Michael J. Watson, Clarkston, both of Mich.

[73] Assignee: Allied-Signal Inc., Morristown, N.J.

[21] Appl. No.: 444,068

[22] Filed: Nov. 30, 1989

[51] Int. Cl.⁵ .............................................. B60R 21/16
[52] U.S. Cl. ..................................... 280/743; 493/243; 493/186; 493/462; 493/940
[58] Field of Search ............... 280/743, 728, 730, 732; 493/243, 244, 186, 462, 940; 55/381; 383/3; 244/147, 148; 53/429, 430

[56] References Cited

U.S. PATENT DOCUMENTS

| | | | |
|---|---|---|---|
| 3,596,443 | 8/1971 | Goldberg | 55/381 |
| 3,748,477 | 7/1973 | Wulbrecht | 280/743 |
| 4,004,828 | 1/1977 | Sogabe et al. | 280/743 |
| 4,235,453 | 11/1980 | Lawson et al. | 280/743 |
| 4,286,954 | 9/1981 | McArthur et al. | 280/743 |
| 4,351,544 | 9/1982 | Ross | 280/743 |
| 4,512,464 | 4/1985 | Sylvester | 53/429 |

FOREIGN PATENT DOCUMENTS 147341 12/1978 Japan ................................... 280/743

*Primary Examiner*—Charles A. Marmor
*Assistant Examiner*—Karin Tyson

[57] ABSTRACT

A method of folding an air bag and an air bag having a main panel 20 defining a top (26), front (24), and bottom (28) portions and side panels (44a,b) the top and bottom portions defining a neck 30 narrower than the front portion; comprising the steps of: laying bag with bottom portion (28) of main panel (22) flat and as fully extended as possible; flattening the front portion (24) of the main panel (20) to over the flattened bottom portion to form a first lateral extending fold (80) between the bottom (28) and front portions (24) of the bag; maintaining a portion of the front panel (24), proximate the bottom panel (28), relatively flat and folding over the front portion with the top portion to define a second lateral fold (82) between a top portion and the front portion with the top portion flattened and extended as fully as possible, aligning edges (86) of opposing top and bottom portions; placing bag material towards a centerline (70) of bag to form on each side of the bag (20) first (90) and second (92) exterior fore-aft folds and a first interior fold (94); moving the first interior fold out to the aligned edges, between the first and second fore-aft folds, to form a third fore-aft fold (94'); defining on the top (26) and bottom (28) portions of the air bag (20) respective sets of top and bottom fold lines (100a,b), the lateral spacing being approximately equal in dimension to the neck portion (30); moving the first, second and third fore-aft folds and associated air bag material toward the bag centerline and placing same between and aligned with a respective set of top and bottom fold lines forming a top fold (102) and bottom fold (104).

14 Claims, 4 Drawing Sheets

AIR BAG AND FOLDING TECHNIQUE

BACKGROUND AND SUMMARY OF THE INVENTION

The present invention relates to an air bag for use in a passenger safety restraint system and more particularly to an air bag folded in a manner to enhance its operation and improve occupant safety. In addition, the present invention finds specific application with vehicle safety air bags adapted to protect the passenger and middle occupant.

Air bags have been proposed and used as part of passenger restraint systems which automatically deploy in emergency crash conditions. The air bags are typically stored in a deflated, folded condition in a location within the passenger compartment such as the instrument panel. During the crash and in response to a crash sensor of known variety, an inflation medium such as compressed gas or gas generator or combination of the two is actuated to communicate inflation gas to the air bag. The air bag softens or at least cushions the motion of the occupant thereby protecting same from serious injury.

The prior art teaches various types of folding or rolling techniques. One such technique which incorporates lateral folds within an air bag is illustrated in U.S. Pat. No. 4,235,453. Another patent utilizing what is called a "bubble roll" is shown in U.S. Pat. No. 3,748,477. Modern air bag systems propose placing the air bag within a housing or cavity (located in the instrument panel), having a transverse width significantly smaller than the width of the inflated passenger side air bag. As such, it is important to fold or position the air bag within such narrow opening in a manner that upon deployment the air bag can achieve its fully inflated width in an efficient manner. The present invention improves upon the technique shown in U.S. Pat. No. 3,748,477 by achieving a narrow folded diameter sufficient to fit within the narrow reaction can or housing while still permitting the efficient inflation thereof.

Accordingly, the invention comprises: an air bag and method of folding same such that its subsequent inflation volume increases in a manner so that it remains positively pressurized and provides a means to protect an occupant of a motor vehicle. The air bag having a deflated, rolled/folded condition and stored within a narrow opening in the passenger compartment of the vehicle and having an inflated unrolled/unfolded condition achieving a size substantially larger than the width of the opening. The air bag comprising: a main panel; and two side panels having a major oblong portion and first narrow portion, the main panel sewn to the side panels to form the air bag. The main panel define a top portion, front portion and bottom portion, with the ends of the top and bottom portions generally opposite the front portion that are narrowed to define a narrow neck portion. The air bag, as a result of the method used to fold same including a laterally outward extending first fold formed generally along a part of the bottom portion; a laterally outward extending second fold formed in the main panel proximate the top and front portions to permit the top portion and bottom portions to reside as at least partially aligned top and bottom layers of air bag material. In addition, the bag includes folding means for reducing the width dimension of the air bag to approximate the width of the neck portion, including a plurality of generally fore-aft extending folds, such that the air bag achieves a partially folded condition, having generally rectangular shaped with the neck portion at one end thereof, the plurality of folds formed of the air bag material between top and bottom layers; a rolled portion of air bag material formed starting at an end of the plurality of folds opposite the neck portion; the unrolled portion of the partially folded condition forming a flap being itself partially or totally folded over a portion of the rolled portion so as to form an upper surface covering part or all of the rolled portion when deflated, the flap forming a transitory envelope or air sack upon inflation, wherein upon inflation the envelope urges the rolled portion to unroll in a direction toward an occupant drawing material from the rolled portion to prevent same from forceably contacting the occupant. Various method claims define the steps used to achieve an air bag of the type described above.

Many other objects and purposes of the invention will be clear from the following detailed description of the drawings.

Figure 1:
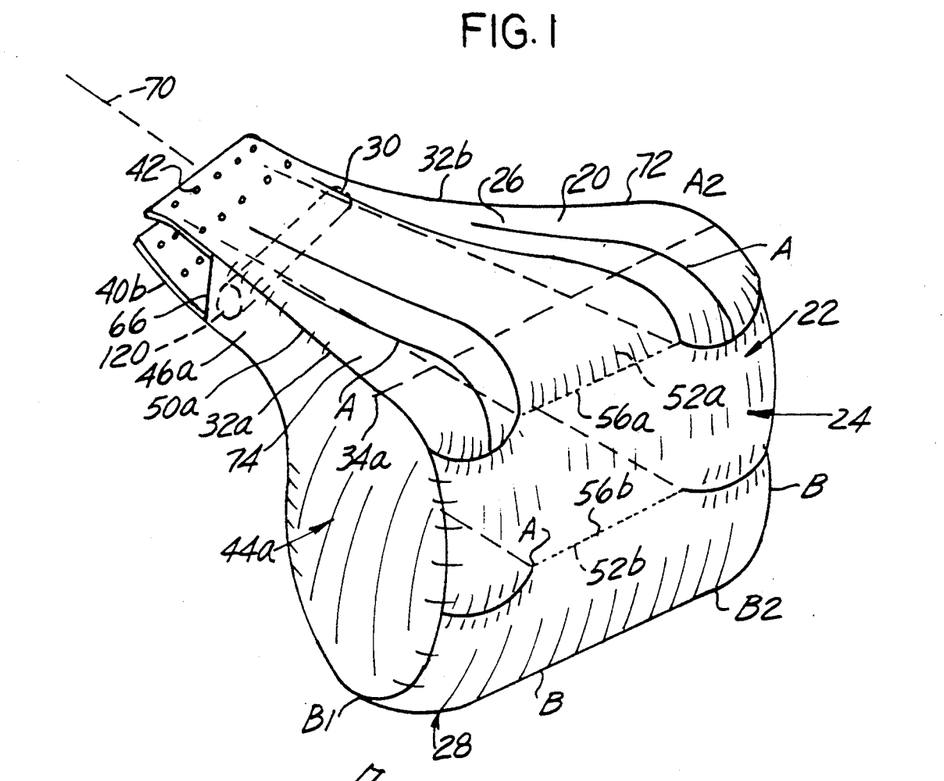
FIG. 1 illustrates a projected view of an inflated air bag.

Detailed Description of the Drawings:

FIG. 1 illustrates an air bag 20 in its inflated state. The air bag comprises a main panel 22 of integral construction. The main panel may be fabricated of a nylon having various weave densities such as 420 denier nylon 72×46 or 49.5×49.5, 840 denier nylon having a weave density of 32×32, or 630 denier nylon with weave density of 38×38, etc.

The main panel 22 comprises a substantially rectangular front portion 24, a top portion 26, and a bottom portion 28. Since the main panel comprising the top, front and bottom portions are of integral construction, one cannot identify precisely where one portion begins and the other portion ends. The top portion 26 is of a generally curved, trapezoidal-like shape tapering toward a narrow neck portion 30. The lateral edges 32a and 32b of the top portion are generally arcuately shaped and at some dimension (such as between points 34a and 34b) the top portion achieves it maximum width shown as A. The bottom portion 28 is dimensionally longer than the top portion and is similarly generally trapezoidal-like in shape and tapers toward a corresponding neck portion 30 in a manner similar to the top portion 26. As mentioned above, the air bag 20 is stored in a can or cavity. As such, the design of the end of the air bag may differ depending upon what type of structure the air bag is to be attached. As shown in the figures, the ends of both the top and bottom portions 26 and 28 respectively include a flap 40a and 40b having registered openings 42. The significance of the flaps 40a and 40b will be discussed below. This end construction may differ according to the type of attachment used. The air bag 20 further includes limaconical (kidney) shaped side panels 44a and b (panel 44b is not visible in FIG. 1). The shape of the side panels 44a,b give the air bag its elongated downward shape, which is preferred for top mounted applications. The narrow end 46a (and b) extend toward the neck portion 30 of the bag. The side panels 44a and b are sewn to the main panel 22 along sew lines such as 50a and b. The bag 20 may optionally include a plurality of tethers which position the bag restricting the billowing of the front portion 24. In the embodiment shown the tethers 52a and b are formed as rectangular or trapezoidal strips of air bag-like material extending from frontal sew lines 56a and b to the flaps 40. The ends of the tethers 56 proximate the flaps 40 may include a set of openings similar to openings 42. The tethers may also be formed as narrow strips of webbing such as used for seat belts, cargo ties, etc.

Figure 2:
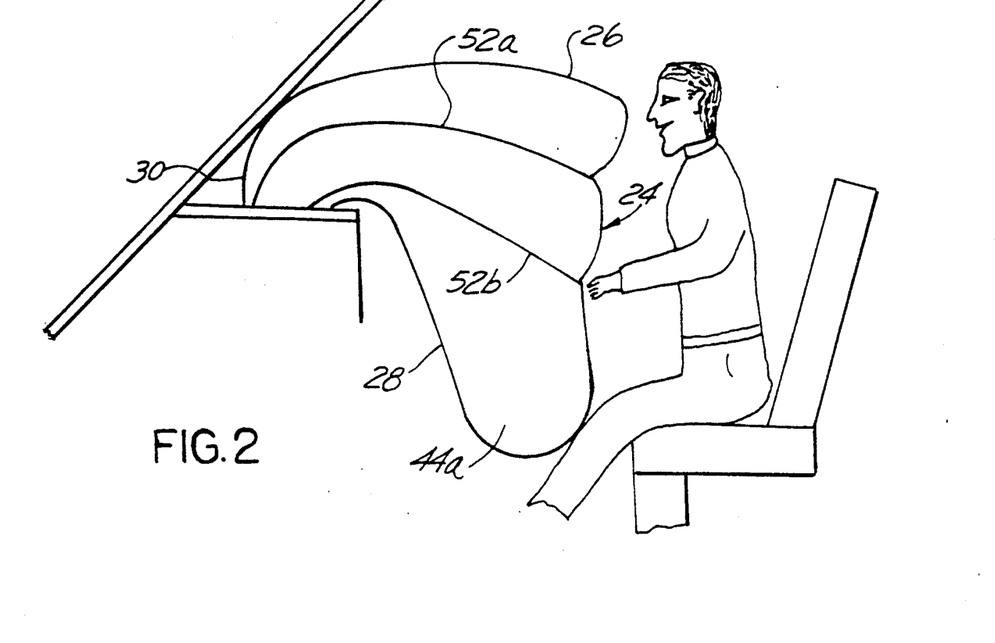
FIG. 2 illustrates a plan view of the inflated air bag.

FIG. 2 illustrates a side view of the inflated air bag and illustrates the functioning of the tethers 52a and b. As mentioned above, the tethers restrict the billowing of the central portion 58 of the main panel 20. In addition, the tethers define the trajectory of the air bag as it inflates, that is, the tethers such as the upper tether 52a aids in pulling the air bag down so as to contact the lower torso of an occupant. The lower tether 52b restricts the billowing of the lower portion of the front panel during deployment so as to restrict the impact of the air bag with the upper torso and head of an occupant.

Figure 3:
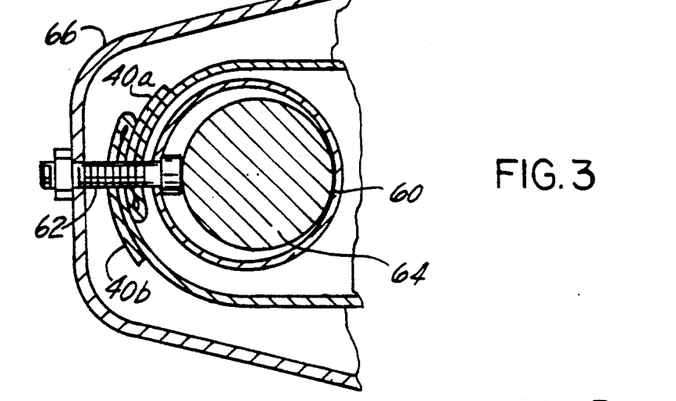
FIG. 3 illustrates a means for attaching the air bag to a cylindrical housing.

FIG. 3 illustrates the means of attaching the air bag 20 to a type of housing such as a cylindrical housing or can 60. The method of attachment will vary with the specific application mounting and storage scheme used. One such technique is taught in the commonly owned U.S. Pat. No. 401,216, "Integral Retainer and Heat Shield", which is incorporated herein by reference. More specifically, FIG. 3 illustrates an open ended cylindrical retainer 60 having a plurality of studs 62 extending therefrom for securing a gas generator 64 therein. It is envisioned that the retainer 60 would be inserted into the open end 66 proximate the neck 30 of the air bag shown in FIG. 1 with the studs extending outwardly. The flaps 40a and b would be folded upon themselves such that the sets of openings are registered one to the other and then these registered openings would be fitted about the plurality of studs such as stud 62 thereby securing the air bag about the cylinder. The cylinder could be placed in a canister or outer housing 66. As mentioned, the ends of the tethers 52a and b may include a set of openings similar to 42 wherein the tethers are similarly wrapped about the can 60 and secured by the respective studs 62.

The purpose of the air bag 20 is to restrain a non-driving passenger and a middle passenger, where applicable, within the vehicle. As such, the air bag 20 may not be completely symmetrical about a centerline 70 (see FIG. 8). As can be understood, in its inflated condition, the right hand portion 72 of the air bag will impact and be restrained at the right hand door of the vehicle and, as such need not extend outwardly as far as the left hand side 74 of the air bag would extend toward the middle of the vehicle to protect the middle seated occupant. As such, the left hand portion of the air bag as measured relative to the centerline 70 may be greater than the right hand portion.

Figure 4:
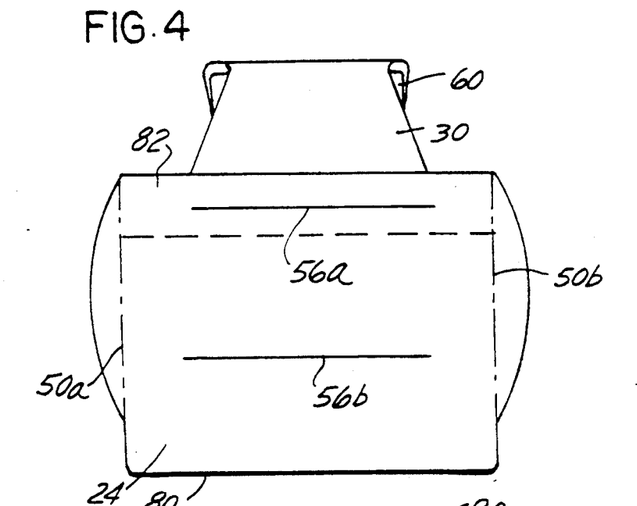
FIGS. 4-19 illustrate steps in the folding of an air bag.
Figure 5:
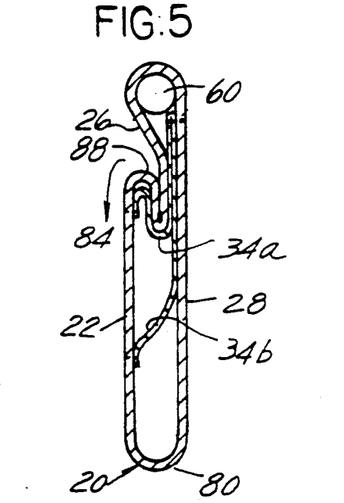

In the bag's deflated condition it is folded relative to the retainer 60 or outer housing such as 66, proximate the neck, and stored within a portion of the vehicle such as in a portion of the dashboard. Typical installation locations previously used have placed the passenger side air bag 20 in a frontal facing area of the dashboard or alternatively in the vertical shelf forming the top portion of the instrument panel. In this vertical mount condition, upon inflation the air bag typically will inflate upwardly, interact with the vehicle environment and be diverted downwardly to protect the passenger. To achieve the bag's folded condition, it is envisioned that the bag would be laid flat with the bottom portion 28 of the air bag also laid flat and with the front portion 22 folded over the top portion of the air bag as shown in FIGS. 4 and 5. As can be seen, certain of the sew lines 50a and b are visible in FIG. 4. In the orientation shown in FIGS. 4 and 5, the bottom and front portions 22 and 28 form a first lateral extending fold 80. Also visible in FIG. 4 are the sew lines 56a and b for the tethers 52a and b (if used). In addition, the top 26 and front portions 22 form a second laterally extending fold 82. Thereafter, the top portion 26 is flattened by taking the second lateral fold 82 and moving it forwardly in the direction of arrow 84 (see FIG. 5) to the configuration of FIGS. 6 and 7. As can be seen from FIGS. 6 and 7, this operation forms a rear facing lateral fold 84.

Figure 6:
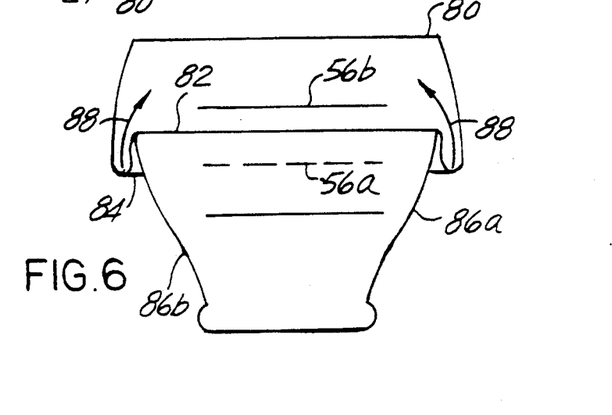
Figure 7:
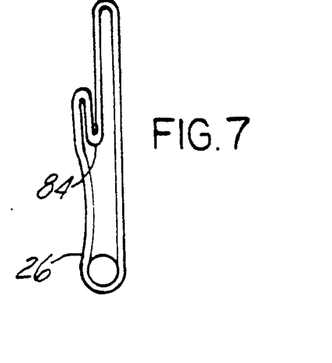

To achieve the condition in FIG. 6, it should be appreciated that portions of the air bag 20 including its side panels 44a and b, proximate the sides of the air bag have been pushed, placed or folded inwardly so as to form the arcuately shaped edges 86a and b of air bag material.

Figure 8:
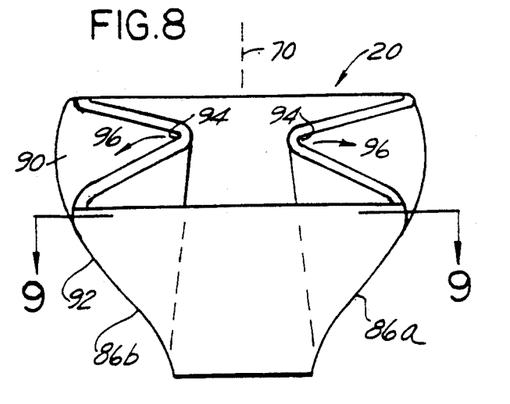
Figure 9:
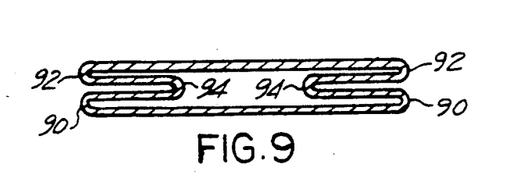

Thereafter, the ends of the interior lateral fold 84 are brought forwardly and inwardly, as indicated by arrows 88, to form first and second fore-aft exterior folds 90 and 92 on each side of the bag 20 and a first interior fold 94. These first and second fore-aft folds on both sides of the bag 20 at least towards the rear of the bag are aligned generally along edges 86a,b. As can be appreciated, the first interior fold 94 will extend generally along the lines of the previously folded bag material (see reference numerals 44a and b). The depth of penetration of the first interior folds 94 toward the centerline 70 of the bag is obtained in a manner where the middle portions of the bag are pushed inwardly while still maintaining the exterior edges of the folds 90 and 92 of the top and bottom portions of the bag in a generally aligned, registered condition using stitch lines 50a and b as a reference. FIG. 9 which is a cross sectional view through a portion of the folded bag of FIG. 8 showing a portion of the first and second fore-aft exterior folds 90 and 92 in generally overlapping condition and the first interior fold 94 facing the centerline 70 of the bag. It should be appreciated that these folds may not be symmetrically positioned if the bag is itself unsymmetric about the centerline 70.

Figure 10:
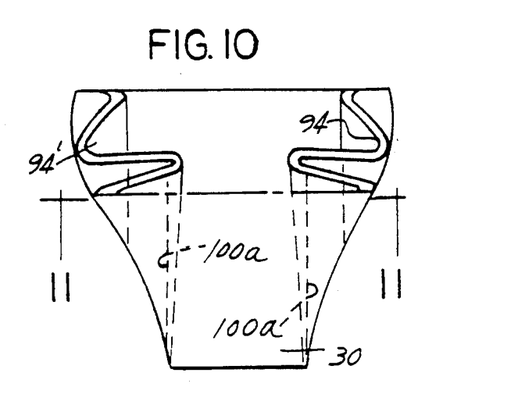
Figure 11:
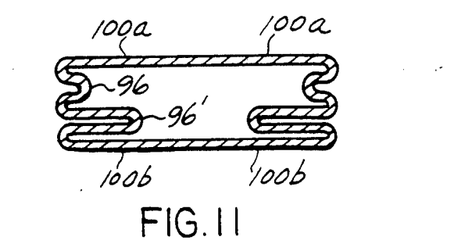

After forming the bag as shown in FIGS. 8 and 9, the center point of the first interior fold (or at least the outer of the two layers of material forming the fold 94) is moved outwardly generally shown by arrows 97 of FIG. 8 and moved such that the material lying along the first interior fold 94 is brought outwardly toward the edges 86a and b of the bag and aligned in a registered condition with the first and second fore-aft folds 90 and 92 respectively, thereby yielding, at least along a portion of the edges 86a and b, a third fore-aft fold shown as 94'. In this folded condition, there will also exist two fore-aft inner folds 96 and 96'. It should further be appreciated that since the bag is narrower at its neck end 30 than at its front end 24. When the bag is folded such as in FIGS. 10 and 11 the inward extent of the second and third interior folds 96 and 96' will extend inwardly at varying lengths.

In the folding of the bag it is desirable to reduce the lateral width of the forward positions, i.e., edges, of the bag to approximately the lateral dimension of the neck portion 30. It has been assumed that the cavity, can or housing such as 66 used to house the folded bag is approximately slightly larger than the width of the neck. This is accomplished by defining on the top and bottom portions 26 and 28 of the partially folded air bag respective sets of top and bottom fold lines 100a and b, the lateral spacing being generally approximately equal to the width dimension of the neck portion 30. The top fold line 100a may be seen in FIGS. 10 and 11, while the bottom fold line is diagrammatically shown in FIG. 11. Thereafter, the first, second and third exterior folds 90, 92 and 94' are moved inwardly toward the bag centerline 70 such that the outward edges of the folds become registered with the fold lines 100a and b, thereby forming respective top and bottom folds 102 and 104 in each side of the bag. Again because of the unusual shape of the air bag 20, the inward penetration of each of these top and bottom folds will vary.

Figure 12:
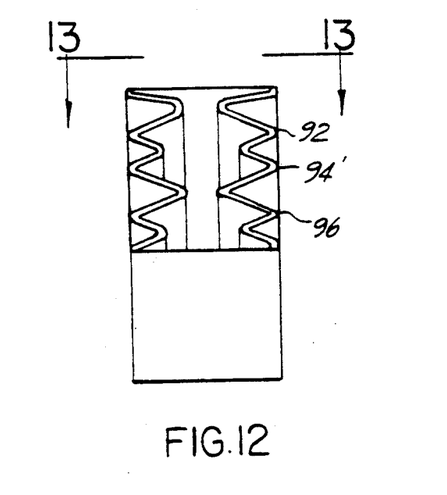
Figure 13:
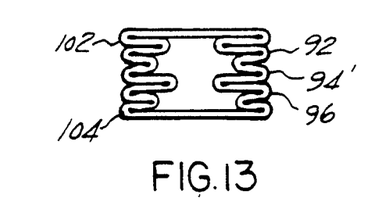

Having performed the above folding steps, the planar dimension of the bag is essentially rectangular in shape (although slightly irregular) emanating from the neck portion 30 as shown in FIG. 12 having a width of about 90% of the opening of the exterior housing into which the bag is to be placed.

Figure 14:
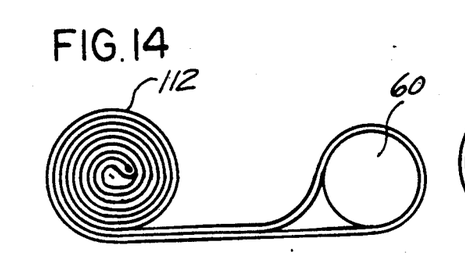
Figure 15:
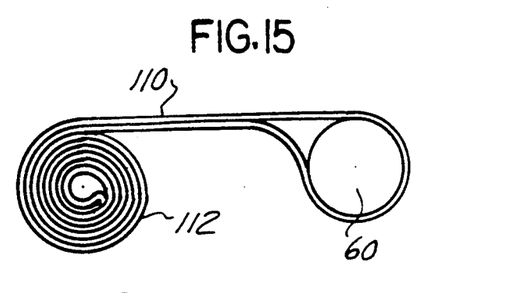
Figure 16:
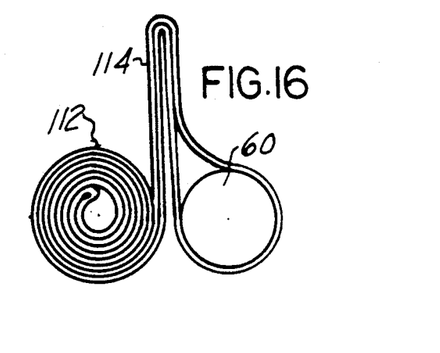
Figure 17:
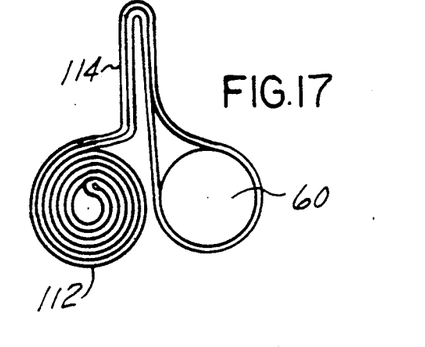
Figure 18:
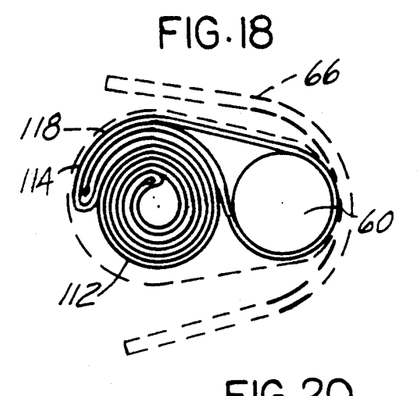
Figure 19:
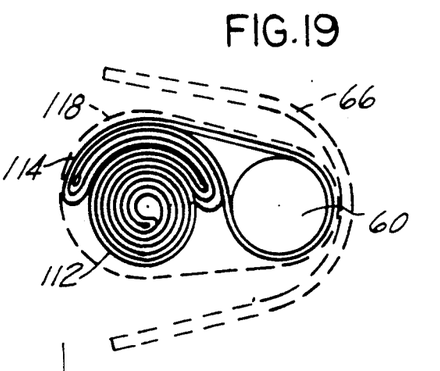

Thereafter the end of the bag opposite the neck 30 is rolled or folded relatively tightly toward the neck 30, and retainer 60 if used. This rolling or folding may either be in a clockwise fashion wherein the bottom portion 28 of the air bag is rolled essentially over the top portion yielding a counter-clockwise spiral roll as shown in FIG. 14, or alternatively, the bag of FIG. 12 may be rolled in a counter-clockwise manner with the bottom portion of the bag rolled beneath the top portion of the bag yielding a clockwise spiral roll as shown in FIG. 15. The rolling of the bag is terminated at a point approximately 2.25 to 2.5 times the exterior housing opening width of the length of the unrolled bag, such point being shown as point 110 in FIGS. 14 and 15. Thereafter, the rolled portion 112 of the air bag is moved laterally adjacent the retainer 60 or other means used to secure the neck 30 to form an upwardly extending flap 114. The flap 114 is thereafter moved in a generally counter-clockwise position to envelope the previously rolled portion 112 of the air bag thereby completing the folding thereof. The air bag in its folded configuration may be secured to the can by enveloping the air bag and retainer with a rupturable or frangible wrapping such as a spun bonded polyolefin material 118. One such material is manufactured by E. I. DuPont under the trade name of TYVEK. The material may include a line of perforations to define a tear line. Thereafter the gas generator 64 is placed in the retainer 60 and the assembly placed in the exterior housing 66. Alternatively, the air bag is inserted in the external housing 66 with the gas generator 64 being installed through a hole in the side of the exterior housing completing the assembly.

Returning briefly to FIG. 1 there is shown a dotted circle 120 in the side panel 44a of the air bag 20. In the folded condition of the air bag the general area defined by the dotted line 120 will be positioned proximate an open end of the can 60. If the material approximate the circle 120 is removed or alternatively slit, thereby yielding access to one of the open ends of the can 60, a gas generator such as 64 may be inserted therein and secured to the can thereby completing the air bag module comprising the can 60, the air bag 20, and the gas generator 64.

Figure 20:
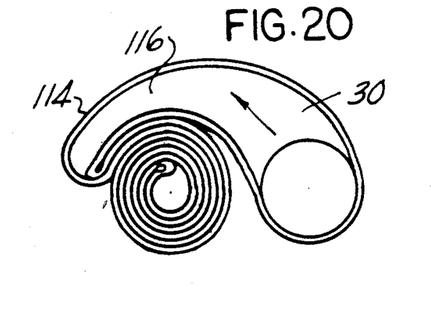
FIG. 20 illustrates a partially inflated air bag.

The operation of the invention during inflation of the air bag 20 is as follows. Inflating gas supplied by an inflation medium such as the gas generator, compressed gas source, or combination of the two or otherwise, is activated during a crash situation thereby initiating deployment of the air bag. The inflation gas is communicated through the neck portion of the air bag and momentarily into the internal portions of the flap 114. Almost immediately the flap 114 is inflated to the position shown in FIG. 20 forming a top bubble 116 which momentarily acts as a restraining means on the remaining folded and rolled portions of the air bag 20. The formation of this bubble 116 is a transitory phenomenon and disappears upon complete inflation of the air bag 20.

Figure 21:
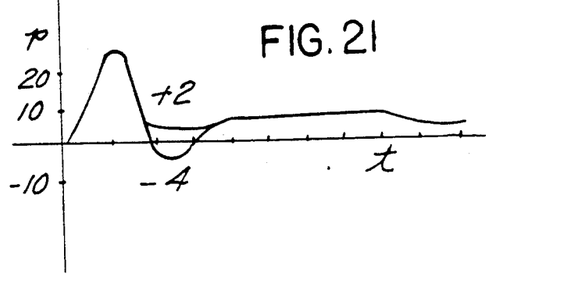
FIG. 21 illustrates a pressure/time relationship.

As the bubble is being formed the exterior wrapped material 118, positioned about the folded air bag tears to permit the bag to expand outwardly. The now inflated flap 114 or bubble 116 forms a momentary relatively rigid top wall of the partially inflated air bag. With this relatively rigid wall in place further introduction of inflation gas into the air bag causes the rolled portion and folded portion of the bag 20 to expand. Also as a momentary phenomenon, as the bag unrolls it exposes portions of the side folds 90, 94; 92, 102, 104 of the bag to the inflation gas thereby enhancing the lateral or sideways deployment of the bag. Further unrolling of the roll will expose additional portions of the side folds to the inflation gas. This process continues as the bag unrolls completely and the side folds expand. As can be seen from the above, the expansion of the air bag can be seen as a series of sequential though continuous steps wherein as the air bag unrolls parts of the folds are exposed to the inflation gas and as such, at any instant the portion of the bag that has previously been unrolled and unfolded is fully expanded thereby maintaining a continuous positive pressure within the bag. This advantage can be seen from the typical air bag pressure graphs shown in FIG. 21 which illustrates the internal bag pressure as a function of time for the present invention and for the same air bag folded in a bellows or accordion-like manner. This graph is representative of air bag performance and has been verified by testing. This type of fold has been referred to in the prior art as an accordion fold. One may envision this accordion fold with reference to FIG. 4, wherein the flattened bag starting at the first lateral edge 80 is alternately folded upon itself toward the neck portion forming a series of laterally extending pleats or folds. As may be envisioned, upon folding a wide air bag of FIG. 4 in this manner, the resulting folds will yield a structure somewhat larger than the width dimension of the neck portion which is similarly larger than the reaction can or housing into which the folded air bag may be placed. Consequently, the ends of the accordion folded main portion of the air bag are themselves folded inwardly to reduce the cross sectional width of the bag. As can be seen in FIG. 21, the air bag pressure attains a momentary maximum value of approximately 25 psi, for most current housing geometries, in approximately 10 milliseconds after inflation, and full deployment is achieved at approximately the 50 milliseconds. For a typical test under FMVSS 208 conditions, i.e., 50% H III adult male anthropomorphic device in mid design seat position, the secondary peak air bag pressure is developed at 55 milliseconds and is maintained for 40-50 milliseconds, i.e. throughout the occupant interaction with the air bag. The distinct difference between the operation of the present invention and the accordion folded air bag is in the 10 to 25-30 millisecond time frame wherein it can be seen that the accordion folded air bag is negatively pressurized. This is thought to happen because the air bag is initially and rapidly pushed out of its associated housing faster than the inflating gas can positively inflate it. One may simply envision the situation wherein the adult is out-of-position such that he may impact the forward positions of the vehicle in the above-mentioned timeframe wherein because of the lack of positive pressure within the air bag there is nothing to cushion the occupant from his inevitable impact. In contrast, due to the sequential unrolling and expansion of the lateral folds in the present invention the volume of the air bag as it unfolds is controlled such that the inflation gases will tend to maintain a positive pressure therein, thereby creating a cushion to protect the out-of-position occupant. In addition, by permitting the air bag to unroll and simultaneously unfold in a lateral sense, it is also believed that this action will lessen the force of the mass of the air bag striking the occupant resulting in a safer inflation of the air bag. During tests of the two above-mentioned bags, the present invention yielded a Head Injury Criterion (HIC) of 40, while the accordion fold (identical bag) yielded an HIC of 261 (650% improvement). HIC is a crash worthiness criterion defined in FMVSS 208. Additionally, the bag slap, a measurement of the impact of the air bag on the occupant, was 859 G's and 376 G's for the accordion and the present invention respectively (a 230% improvement). Performance improvement was also seen in chest deflection, another FMVSS 208 criteria, with the present invention producing only 0.5" of deflection, while the accordion fold caused 0.63" (26% improved). Beyond the measurable data, the improvements were noted in the interaction of the deploying air bag with the out-of-position occupant. In the case of the accordion fold, the air bag seemed to lift the occupant and launch him into the seat back. This is undesirable since the how and where the occupant lands is not controllable. The bubble fold tends to deploy downward and consistently pushes the occupant down and back into the seat, offering a greater degree of protection.

Many changes and modifications in the above described embodiment of the invention can, of course, be carried out without departing from the scope thereof. Accordingly, that scope is intended to be limited only by the scope of the appended claims.

We claim:

1. Method of folding an air bag (20) having a main panel 20 defining a top (26), front (24), and bottom (28) portions and side panels 44a, b) the top and bottom portions defining a neck 30 narrower than the front portion; comprising the steps of:
    1.1 laying bag with bottom portion (28) of main panel (22) flat and as fully extended as possible;
    1.2 flattening the front portion (24) of the main panel (20) to over the flattened bottom portion to form a first lateral extending fold (80) between the bottom (28) and front portions (24) of the bag;
    1.3 maintaining a portion of the front panel (24), proximate the bottom panel (28), relatively flat and folding over the front portion proximate the top portion to define a second lateral fold (82) between a top portion and the front portion with the top portion flattened and extended as fully as possible,
    1.4 aligning edges (86) of opposing top and bottom portions;
    1.5 placing bag material towards a centerline (70) of bag to form on each side of the bag (20) first (90) and second (92) exterior fore-aft folds and a first interior fold (94);
    1.6 moving the first interior fold out to the aligned edges, between the first and second fore-aft folds, to form a third fore-aft fold (94');
    1.7 defining on the top (26) and bottom (28) portions of the air bag (20) respective sets of top and bottom fold lines (100a,b), the lateral spacing being approximately equal in dimension to the neck portion (30);
    1.8 moving the first, second and third fore-aft folds and associated air bag material, toward the bag centerline and placing same between and aligned with a respective set of top and bottom fold lines forming a top fold (102) and bottom fold (104).

2. The method as defined in claim 1 including the steps of:
    2.1 rolling or folding an end of the folded bag, opposite the neck, a predetermined amount toward the neck;
    2.2 moving the rolled up portion (112) of the bag forwardly proximate the neck portion such the bag material between the rolled up portion and neck portion (30) extends away therefrom as a flap (114),
    2.3 enveloping the flap about a portion of the circumference of the rolled up portion, and
    2.4 securing the rolled up portion, flap, and neck together.

3. The method as defined in claim 2 wherein neck portion (30) is secured to a housing can and wherein the step of securing includes wrapping the rolled up portion, flap, neck and retainer with a frangible material.

4. The method as defined in claim 2 wherein the step of rolling includes rolling or folding the folded bag in a clockwise direction.

5. The method as defined in claim 2 wherein the step of rolling including rolling the folded bag in a counterclockwise direction.

6. For an inflatable air bag (20) adapted to be stored in a narrow opening in a passenger compartment of a vehicle in a deflated compact condition and upon inflation thereof to achieve a size significantly larger than the opening, a method comprising the steps of:
    6.1 laying the air bag (20) in a generally flattened condition;
    6.2 forming on each side of the flattened air bag a plurality of folds extending in a general fore-aft direction relative to a narrow neck portion (30) thereof, the neck portion having a width generally narrower than the width of the opening;
    6.3 defining on each side of the air bag a first and second set of the sets of generally parallel top/bottom fold lines (100a, 100b) on the top and bottom of the air bag in its folded condition as established in step, the distance between the first and second set of top/bottom fold lines being approximately equal to the width dimension of the neck portion;
    6.4 simultaneously moving the air bag material associated with the plurality of folds on each side of the air bag in line with a corresponding first and second set of top/bottom fold lines to form, on each side of the air bag, a top fold (102) and a bottom fold (104), yielding a partially folded air bag having a generally rectangular shape with a width dimension equal to or less than the diameter of the opening.

7. For an inflatable air bag (20) adapted to be stored in a narrow opening in a passenger compartment of a vehicle in a deflated compact condition and upon inflation thereof to achieve a size significantly larger than the opening, a method comprising the steps of:

7.1 laying the air bag (20) in a generally flattened condition;

7.2 forming on each side of the flattened air bag a plurality of folds extending in a general fore-aft direction relative to a narrow neck portion (30) thereof, the neck portion having a width generally narrower than the width of the opening;

7.3 defining on each side of the air bag a first and second set of top/bottom fold lines (100a, 100b) on the top and bottom of the air bag in its folded condition as established in step 6.2, the distance between the first and second set of top/bottom fold lines being approximately equal to the width dimension of the neck portion;

7.4 moving the air bag material associated with the plurality of folds in line with a corresponding first and second set of top/bottom fold lines to form, on each side of the air bag, a top fold (102) and a bottom fold (104), yielding a partially folded air bag having a generally rectangular shape with a width dimension equal to or less than the diameter of the opening;

7.5 rolling an end of the folded bag, opposite the neck, a predetermined amount toward the neck;

7.6 moving the rolled up portion (112) of the bag forwardly into contact with the neck portion such the bag material between the rolled up portion and neck portion (30) extend away therefrom as a flap (114), 7.7 enveloping the flap about a portion of the circumference of the rolled up portion, and 7.8 securing the rolled up portion, flap, neck and retainer together.

8. The method as defined in claim 7 wherein neck portion (30) is secured about a cylindrical retainer and wherein the step of securing includes wrapping the rolled up portion, flap, neck and retainer with a frangible material.

9. The method as defined in claim 7 wherein the step of rolling includes rolling the folded bag in a clockwise direction.

10. The method as defined in claim 7 wherein the step of rolling including rolling the folded bag in a counterclockwise direction.

11. An air bag (20) adapted to be inflated in a vehicle to cushion a passenger thereof, the air bag having a deflated, rolled/folded condition and adapted to be stored within a narrow opening in the passenger compartment of the vehicle, the air bag (20) having an inflated unrolled/unfolded condition achieving a size substantially larger than the width of the opening, the air bag comprising:

a main panel (22) and two side panels (44a,b) having a major oblong portion and first narrow portion, wherein the main panel defines a top portion (26), front portion (24) and bottom portion (28), ends of the top and bottom portions generally opposite the front portion are narrowed to define a narrow neck portion (30);

a laterally outward extending first fold (80) formed generally along a part of the bottom portion (28);

a laterally outward extending second fold (82) formed in the main panel proximate the top and front portions to permit the top portion and bottom portion to reside as at least partially aligned top and bottom layers of air bag material;

fold means for reducing the width dimension of the air bag to approximate the width of the neck portion, including a plurality of generally fore-aft extending folds, such that the air bag achieves a partially folded condition, having generally rectangular shape with the neck portion at one end thereof, the plurality of folds formed of the air bag material between top and bottom layers;

a rolled portion (112) of air bag material formed starting at an end of the plurality of folds opposite the neck portion;

the unrolled portion of the partially folded condition forming a flap (114) being itself partially folded over a portion of the rolled portion (112) so as to form an upper surface covering part of the rolled portion when deflated, the flap forming a transitory air sack (116) upon inflation, wherein upon inflation the air sack urges the rolled portion to unroll releasing the entrapped fabric in a predictable, controllable fashion in a direction toward an occupant to cushion same.

12. The air bag as defined in claim 11, the folded means and rolled portion cooperate to provide means for controlling inflation volume of the air bag such that upon inflation thereof when the rolled portion begins to unroll, only certain portions of the interior of the plurality of folds are exposed to inflation gas thereby, in a transitory manner, controlling the inflation volume of the air bag maintaining same in a pressurized condition.

13. An air bag (20) adapted to be inflated in a vehicle to cushion a passenger thereof, the air bag having a deflated, rolled/folded condition and adapted to be stored within a narrow opening in the passenger compartment of the vehicle, the air bag (20) having an inflated unrolled/unfolded condition achieving a size substantially larger than the width of the opening, the air bag comprising:

a top portion (26), front portion (24) and bottom portion (28), ends of the top and bottom portions generally opposite the front portion are narrowed to define a narrow neck portion joined to side portions of the air bag (30);

a laterally outward extending first fold (80) formed generally along a part of the bottom portion (28);

a laterally outward extending second fold (82) formed proximate the top and front portions to permit the top portion and bottom portion to reside as at least partially aligned top and bottom layers of air bag material;

fold means for reducing the width dimension of the air bag to approximate the width of the neck portion, including a plurality of generally fore-aft extending folds, such that the air bag achieves a partially folded condition, having generally rectangular shape with the neck portion at one end thereof, the plurality of folds formed of the air bag material between top and bottom layers;

a rolled portion (112) of air bag material formed starting at an end of the plurality of folds opposite the neck portion;

the unrolled portion of the partially folded condition forming a flap (114) being itself partially folded over a portion of the rolled portion (112) so as to form an upper surface covering part of the rolled portion when deflated, the flap forming a transitory air sack (116) upon inflation, wherein upon inflation the air sack urges the rolled portion to unroll releasing the entrapped fabric in a predictable, controllable fashion in a direction toward an occupant to cushion same.

14. The air bag as defined in claim 13, the folded means and rolled portion cooperate to provide means for controlling inflation volume of the air bag such that upon inflation thereof when the rolled portion begins to unroll, only certain portions of the interior of the plurality of folds are exposed to inflation gas thereby, in a transitory manner, controlling the inflation volume of the air bag maintaining same in a pressurized condition.

* * * * *